(12) United States Patent
Park

(10) Patent No.: US 9,481,371 B2
(45) Date of Patent: Nov. 1, 2016

(54) METHOD AND APPARATUS FOR CONTROLLING SPEED CHANGE OF HYBRID VEHICLE

(71) Applicant: Hyundai Motor Company, Seoul (KR)

(72) Inventor: Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 14/549,832

(22) Filed: Nov. 21, 2014

(65) Prior Publication Data

US 2016/0031433 A1 Feb. 4, 2016

(30) Foreign Application Priority Data

Jul. 29, 2014 (KR) .......................... 10-2014-0096508

(51) Int. Cl.
*B60L 11/00* (2006.01)
*G06F 7/00* (2006.01)
(Continued)

(52) U.S. Cl.
CPC .............. *B60W 30/19* (2013.01); *B60W 10/06* (2013.01); *B60W 10/08* (2013.01); *B60W 10/11* (2013.01); *B60W 20/108* (2013.01); *B60W 20/1062* (2013.01); *B60W 20/14* (2016.01); *B60W 20/30* (2013.01); *B60W 30/18127* (2013.01); *B60W 2050/0026* (2013.01); *B60W 2510/244* (2013.01); *B60W 2520/10* (2013.01); *B60W 2710/083* (2013.01); *B60W 2710/086* (2013.01);
(Continued)

(58) Field of Classification Search
CPC .... B60W 30/19; B60W 10/02; B60W 10/10; B60W 10/11; B60W 20/00; B60W 20/1062; B60W 20/108; F16H 2061/0422; F16H 61/0403; Y10S 903/93; Y10S 903/945
USPC .......... 701/22, 51, 53; 477/21, 15, 31, 34, 37
See application file for complete search history.

(56) References Cited

U.S. PATENT DOCUMENTS 3,603,079 A * 9/1971 Kickbusch .............. F02B 37/02
60/608
5,343,970 A * 9/1994 Severinsky ............ B60K 6/387
180/165
(Continued)

FOREIGN PATENT DOCUMENTS

JP            5348034 B2    11/2013
KR   10-2009-0123182 A    12/2009
(Continued)

*Primary Examiner* — Khoi Tran
*Assistant Examiner* — Jorge Peche
(74) *Attorney, Agent, or Firm* — Mintz Levin Cohn Ferris Glovsky and Popeo, P.C.; Peter F. Corless

(57) ABSTRACT

A method and apparatus for controlling a speed change of a hybrid vehicle are provided. The apparatus includes an engine for combustion of fuel to generate power and a motor that is configured to supplement the power from the engine and operate as a generator during braking to generate electrical energy and store the generated electrical energy generated a battery. A transmission is configured to convert the power from the engine to a required torque based on a speed and transmit the power to wheels and is directly connected to the motor. In addition, a controller is configured to operate the transmission to shift in a constant power section of the motor when the motor is performing regenerative braking. The apparatus minimizes the sense of difference felt by a driver by shifting in the constant power section of the motor during the regenerative braking of a hybrid vehicle.

12 Claims, 6 Drawing Sheets

(51) Int. Cl.
*B60W 30/19* (2012.01)
*B60W 10/11* (2012.01)
*B60W 20/00* (2016.01)
*B60W 10/06* (2006.01)
*B60W 10/08* (2006.01)
*B60W 30/18* (2012.01)
*B60W 50/00* (2006.01)

(52) U.S. Cl.
CPC .. *B60W 2710/1005* (2013.01); *B60W 2720/10* (2013.01); *Y10S 903/945* (2013.01)

(56) References Cited

U.S. PATENT DOCUMENTS

| | | | | |
|---|---|---|---|---|
| 5,459,386 A * | 10/1995 | Okachi | H02P 21/09 | 318/721 |
| 5,713,425 A * | 2/1998 | Buschhaus | B60K 6/36 | 180/297 |
| 5,722,502 A * | 3/1998 | Kubo | B60K 6/442 | 180/65.23 |
| 6,138,071 A * | 10/2000 | Sekine | B60K 31/042 | 180/170 |
| 6,209,672 B1 * | 4/2001 | Severinsky | B60K 6/442 | 180/65.23 |
| 6,591,705 B1 * | 7/2003 | Reik | B60W 10/02 | 74/335 |
| 8,903,581 B2 * | 12/2014 | Bouchon | B60K 6/48 | 180/65.245 |
| 8,948,945 B2 * | 2/2015 | Tsuneishi | B60K 6/547 | 180/65.265 |
| 2004/0249539 A1 * | 12/2004 | Luh | B60W 10/06 | 701/51 |
| 2005/0003929 A1 * | 1/2005 | Fidlin | B60K 17/02 | 477/109 |
| 2005/0104469 A1 * | 5/2005 | Zepp | H02K 7/12 | 310/191 |
| 2007/0072723 A1 * | 3/2007 | Klemen | B60K 6/365 | 475/5 |
| 2008/0033620 A1 * | 2/2008 | Kamichi | B60K 6/445 | 701/59 |
| 2008/0132378 A1 * | 6/2008 | Bouchon | B60K 6/48 | 477/3 |
| 2008/0220933 A1 * | 9/2008 | Maeda | B60K 6/365 | 477/3 |
| 2008/0238108 A1 * | 10/2008 | Edelson | B60L 11/04 | 290/40 C |
| 2009/0088937 A1 * | 4/2009 | Matsubara | B60K 6/445 | 701/55 |
| 2009/0171523 A1 * | 7/2009 | Luo | B60K 6/405 | 701/22 |
| 2009/0227409 A1 * | 9/2009 | Ito | B60K 6/445 | 475/5 |
| 2010/0064831 A1 * | 3/2010 | Lee | F16H 3/76 | 74/22 R |
| 2010/0093486 A1 * | 4/2010 | Suzuki | B60K 6/40 | 477/3 |
| 2010/0229544 A1 * | 9/2010 | Bollinger | F15B 1/024 | 60/413 |
| 2010/0252343 A1 * | 10/2010 | Hilberer | B60T 7/122 | 180/65.25 |
| 2011/0174561 A1 * | 7/2011 | Bowman | B60K 6/46 | 180/65.245 |
| 2011/0198140 A1 * | 8/2011 | Wallner | B60K 6/365 | 180/65.28 |
| 2012/0100957 A1 * | 4/2012 | Reitz | B60K 6/445 | 477/8 |
| 2012/0116622 A1 * | 5/2012 | Kim | F16H 3/728 | 701/22 |
| 2012/0130579 A1 * | 5/2012 | Steuernagel | B60K 6/442 | 701/22 |
| 2012/0149515 A1 * | 6/2012 | Holmes | B60K 6/365 | 475/5 |
| 2012/0264553 A1 * | 10/2012 | Bucknor | B60K 6/365 | 475/5 |
| 2012/0271493 A1 * | 10/2012 | Gratton | B60L 15/20 | 701/22 |
| 2013/0029805 A1 * | 1/2013 | Matsuo | B60W 10/06 | 477/5 |
| 2013/0030638 A1 * | 1/2013 | Nissato | B60K 6/442 | 701/22 |
| 2013/0149093 A1 * | 6/2013 | Kaneko | E02F 9/0858 | 414/685 |
| 2013/0226384 A1 * | 8/2013 | Tanishima | B60L 11/123 | 701/22 |
| 2013/0291830 A1 * | 11/2013 | Doering | F02D 41/023 | 123/350 |
| 2013/0296105 A1 * | 11/2013 | Grutter | B60K 6/48 | 477/5 |
| 2013/0296110 A1 * | 11/2013 | Shelton | B60K 6/48 | 477/5 |
| 2013/0296123 A1 * | 11/2013 | Doering | B60W 10/02 | 477/5 |
| 2013/0296124 A1 * | 11/2013 | Pietron | B60W 20/40 | 477/5 |
| 2014/0210262 A1 * | 7/2014 | Yaegaki | B60K 6/48 | 307/10.1 |
| 2014/0229043 A1 * | 8/2014 | Frank | B60W 20/20 | 701/22 |
| 2014/0379184 A1 * | 12/2014 | Kim | F02N 11/108 | 701/22 |
| 2015/0031491 A1 * | 1/2015 | Otten | F16H 3/56 | 475/269 |
| 2015/0031503 A1 * | 1/2015 | Isomura | B60W 10/113 | 477/5 |
| 2015/0057866 A1 * | 2/2015 | Tseng | B60W 30/19 | 701/22 |
| 2015/0094889 A1 * | 4/2015 | Oh | B60T 13/74 | 701/22 |
| 2015/0210268 A1 * | 7/2015 | Yang | B60K 6/387 | 74/661 |
| 2015/0211614 A1 * | 7/2015 | Yang | F16H 37/0806 | 74/661 |
| 2015/0211615 A1 * | 7/2015 | Yang | F16H 37/0806 | 74/661 |
| 2015/0211616 A1 * | 7/2015 | Yang | F16H 37/0806 | 74/661 |
| 2015/0232082 A1 * | 8/2015 | Frank | B60W 20/10 | 701/22 |
| 2015/0330491 A1 * | 11/2015 | Matsumura | F16H 3/423 | 475/149 |
| 2016/0031432 A1 * | 2/2016 | Gibson | B60W 10/02 | 477/5 |
| 2016/0114792 A1 * | 4/2016 | Gibson | B60W 20/40 | 701/22 |

FOREIGN PATENT DOCUMENTS

| | | |
|---|---|---|
| KR | 10-2014-0005545 A | 1/2014 |
| KR | 10-1393562 B1 | 5/2014 |

* cited by examiner

METHOD AND APPARATUS FOR CONTROLLING SPEED CHANGE OF HYBRID VEHICLE

CROSS-REFERENCE TO RELATED APPLICATION

This application claims priority to and the benefit of Korean Patent Application No. 10-2014-0096508 filed in the Korean Intellectual Property Office on Jul. 29, 2014, the entire contents of which are incorporated herein by reference.

BACKGROUND (a) Field of the Invention

The present invention relates to an apparatus and method for controlling a speed change of a hybrid vehicle. More particularly, the present invention relates to an apparatus for controlling a speed change of a hybrid vehicle, in which shifting is performed in a constant power region of a motor for adjusting a regenerative braking torque to be substantially uniform.

(b) Description of the Related Art

A hybrid vehicle uses two or more power sources, in general, an engine and a motor. Since the hybrid vehicle uses two or more power sources of the engine and the motor, the hybrid vehicle may have a variety of structures. The motor provided to the hybrid vehicle operates to supplement engine power during acceleration or hill climbing (e.g., uphill driving). In addition, the motor provided to the hybrid vehicle is operated as a generator during braking of the vehicle to generate braking force by converting kinetic energy generated during the braking to electrical energy. Thus, the converted electrical energy is charged to a battery.

A system for converting the kinetic energy generated during the braking to electrical energy and recovering the electrical energy thus recovered is called a regenerative braking system. FIGS. 1 (a) and (b) are exemplary graphs showing characteristics of a motor applied to a general hybrid vehicle, respectively. Referring to FIGS. 1 (a) and (b), the motor applied to the hybrid vehicle has a substantially constant torque region and a substantially constant power region divided based on a rotation speed of the motor.

Referring to FIG. 1 (a), when the rotation speed of the motor is less than a threshold speed, though the torque of the motor is maintained substantially constant, when the rotation speed of the motor is greater than the threshold speed, the torque of the motor may reduce exponentially. In particular, a section in which the torque of the motor is maintained substantially constant is called a constant torque section. Referring to FIG. 1 (b), when the rotation speed of the motor is less than the threshold speed, although the power of the motor increases linearly, when the rotation speed of the motor is greater than the threshold speed, the power of the motor is maintained substantially constant. In particular, a section in which the power of the motor is maintained substantially constant is called a constant power section.

Further, referring to FIG. 2, a total braking torque of the hybrid vehicle (see FIG. 2 (c)) is a sum of a hydraulic pressure braking torque (see FIG. 2 (b)) from a hydraulic pressure braking system and the regenerative braking torque (see FIG. 2 (a)). In particular, when the regenerative braking torque is reduced, it is required to meet a required braking torque by increasing the hydraulic pressure braking torque. However, a general hydraulic pressure braking system has a slower response speed than that of the motor. Therefore, since a time point at which the braking torque of the hydraulic braking system supplements the regenerative braking torque of the motor is delayed at a section in which the regenerative braking torque of the motor rapidly changes, a driver may feel such a sense of difference. Particularly, the sharp or rapid change of the regenerative braking torque occurs distinctively at a threshold speed where the constant power section changes to the constant torque section during a speed reduction of the hybrid vehicle.

The above information disclosed in this section is merely for enhancement of understanding of the background of the invention and therefore it may contain information that does not form the prior art that is already known in this country to a person of ordinary skill in the art.

SUMMARY

The present invention provides an apparatus for controlling a speed change of a hybrid vehicle having an advantage of reducing a feeling of a sense of difference during regenerative braking of the hybrid vehicle. In addition, the present invention provides a method and an apparatus for controlling a speed change of a hybrid vehicle, in which a speed change time point of a transmission is controlled during regenerative braking of the hybrid vehicle for improving braking stability.

An apparatus for controlling a speed change of a hybrid vehicle may include an engine for combustion of fuel to generate power, a motor configured to supplement the power from the engine and operate as a generator during braking to generate electrical energy and store the generated electrical energy to a battery, a transmission configured to convert the power from the engine to a required torque according to a speed and transmit the power to wheels and directly connected to the motor, and a controller configured to operate the transmission to shift in a constant power section of the motor when the motor is under regenerative braking.

The controller may be configured to compare the present vehicle speed to a final target speed and shift the present transmission stage when the present vehicle speed is less than the final target speed. The final target speed may be set as a speed having a greater value selected from a target speed calculated from the present transmission stage and the present vehicle speed, and a value obtained by addition of a margin to a threshold speed of the motor calculated from the present transmission stage of the transmission and available power from the battery.

The threshold speed of the motor may be a speed when a rotation speed of the motor is changing from the constant power section to a constant torque section. The threshold speed of the motor may be stored in the controller in a mode of map data from a relation between the present transmission stage and the available power from the battery. The target speed may be stored in the controller in a mode of map data from a relation between the present transmission stage and the present vehicle speed.

In another aspect of the present invention, a method for controlling a speed change of a hybrid vehicle driven by engine power and motor power which supplements the engine power may include detecting, by a controller, a vehicle speed, a transmission stage of a transmission, and available power from a battery, and shifting, by the controller, the transmission stage of the transmission in a constant power section of the motor from the vehicle speed, the present transmission stage of the transmission, and the available power from a battery when the motor is under regenerative braking.

The shifting of the transmission may include calculating a target speed from the vehicle speed and the present transmission stage, calculating a threshold speed of the battery from the vehicle speed and the available power from the battery, calculating a final target speed from the target speed and the threshold speed, comparing the final target speed to the vehicle speed, and shifting the transmission stage when the vehicle speed is less than the final target speed. The threshold speed may be a speed when a rotation speed of the motor is changing from the constant power section to a constant torque section.

The final target speed may be set as a speed having a greater value selected from a target speed calculated from the present transmission stage and the present vehicle speed, and a value obtained by addition of a margin to a threshold speed of the motor calculated from the present transmission stage of the transmission and available power from the battery. The threshold speed of the motor may be a speed when a rotation speed of the motor is changing from the constant power section to a constant torque section. Thus, the apparatus for controlling a speed change of a hybrid vehicle of the present invention may minimize the sense of difference felt by a driver by shifting in the constant power section of the motor during the regenerative braking of a hybrid vehicle.

BRIEF DESCRIPTION OF THE DRAWINGS

The attached drawings illustrate exemplary embodiments of the present invention, provided for describing the present invention in more detail, but not for limiting technical aspects of the present invention.

DETAILED DESCRIPTION

Figure 1:
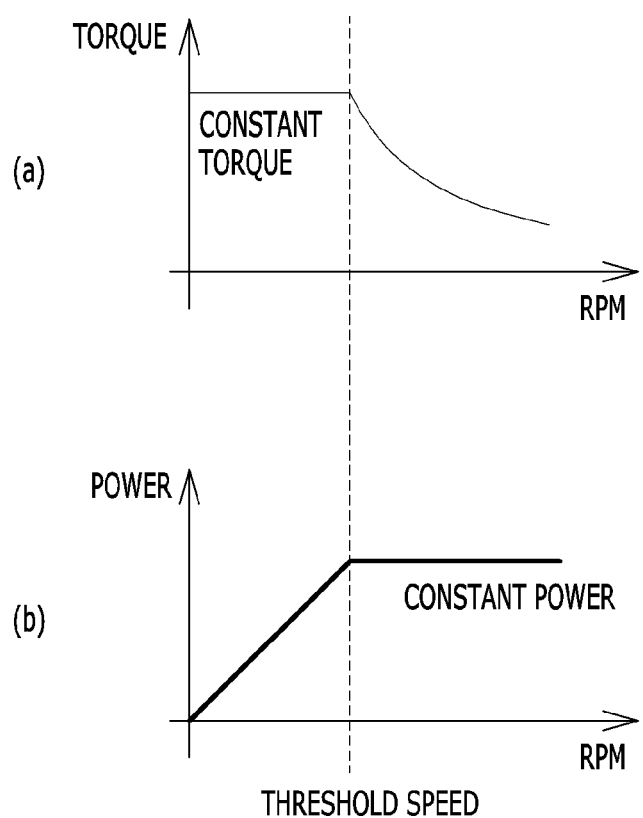
FIGS. 1 (a) and (b) are exemplary graphs showing characteristics of a motor applied to a general hybrid vehicle, respectively according to the related art.
Figure 2:
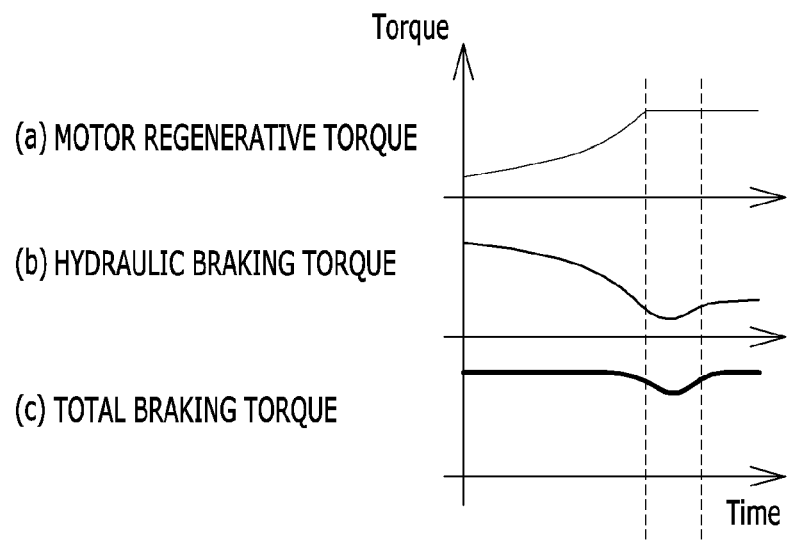
FIG. 2 (a) to (c) illustrate exemplary graphs showing a regenerative braking torque, a hydraulic braking torque, and a total braking torque versus time, respectively according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described hereinafter with reference to the accompanying drawings in detail, such that persons skilled in this field of art may easily carry it out. However, as those skilled in the art would realize, the present invention may be modified in various different ways, and may not be limited to the exemplary embodiment described herein. Parts not relevant to the present invention will be omitted for describing the present invention clearly, and throughout the specification, identical or similar parts will be given the same reference numbers. Further, since sizes and thicknesses of elements are shown at will for convenience of description, the present invention is not always limited to the drawings, but the thicknesses are enlarged for clearly expressing different parts and regions.

Figure 3:
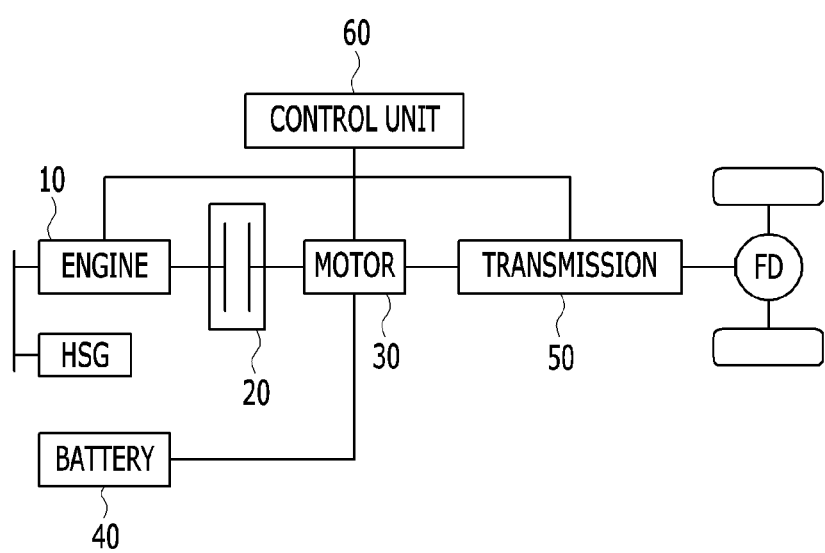
FIG. 3 is an exemplary conceptual drawing of an apparatus for controlling a speed change of a hybrid vehicle according to an exemplary embodiment of the present invention.

FIG. 3 is an exemplary conceptual drawing of an apparatus for controlling a speed change of a hybrid vehicle in accordance with an exemplary embodiment of the present invention. Referring to FIG. 3, the apparatus for controlling a speed change of a hybrid vehicle may include an engine 10 for combustion of fuel to generate power, a motor 30 configured to supplement the power of the engine 10 and operate as a generator during braking to generate electrical energy and store the electric energy to a battery 40, a transmission 50 configured to convert the power from the engine 10 into a required torque based on a speed and transmit the required torque to wheels, and directly connected to the motor 30, and a controller 60 configured to operate the transmission 50 to shift in a constant power section of the motor 30 during regenerative braking of the motor 30. The controller 60 may be at least one processor operative according to a preset program, wherein the preset program is executed to carry out the steps of a method for controlling a speed change of a hybrid vehicle in accordance with an exemplary embodiment of the present invention.

The controller 60 may be configured to compare a present vehicle speed to a final target speed to shift the present transmission stage of the transmission 50 to a lower transmission stage when the present vehicle speed is less than the final target speed to shift in the constant power section during the regenerative braking of the motor 30. In particular, since the motor 30 and the transmission 50 are directly coupled, when a speed of an output shaft of the motor 30 and the present transmission stage are determined, the present vehicle speed may be obtained.

The final target speed may be set as the greater speed between a target speed calculated from the present transmission stage of the transmission 50 and the present vehicle speed, and a value obtained by addition of a margin to a threshold speed of the motor 30 calculated from the available power of the battery 40. In particular, the addition of the margin to the threshold speed is for maintaining a time period required for shifting the transmission 50 since a time period is required for shifting the transmission 50 when the transmission is shifted at the threshold speed.

The threshold speed of the motor 30 may be a speed when the rotation speed of the motor 30 is changing from the constant power section to the constant torque section, and may be stored in the controller 60 in a mode of map data from a relation between the present transmission stage and the available power of the battery 40. Since the threshold speed may vary with the present transmission stage and the available power from the battery 40, the threshold speed according to the present transmission stage and the available power of the battery 40 may be stored in the mode of the map data mode.

Figure 4:
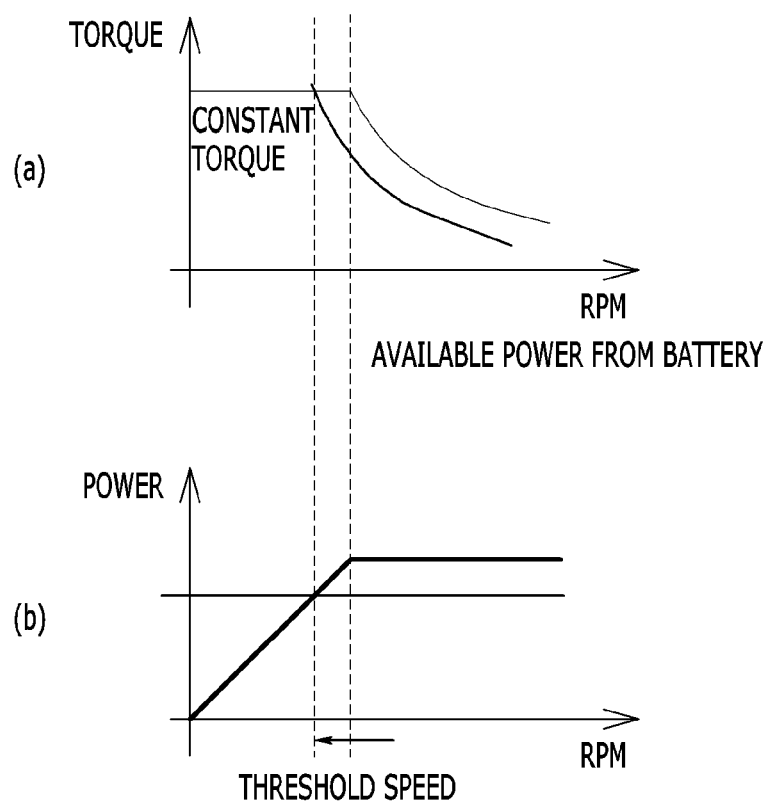
FIGS. 4 (a) and (b) are exemplary graphs showing a change of a threshold speed according to power available from a battery according to an exemplary embodiment of the present invention.

In other words, as shown in FIG. 4, when the available power from the battery is reduced, the threshold speed may be reduced, and when the available power from the battery is increased, the threshold speed may increase. Therefore, by reflecting the threshold speed according to the available power from the battery, a speed change time point may be more accurately calculated. In particular, the available power from the battery 40 may be a quantity of a current possible to output from the battery 40 per unit time period. Further, the target speed may be stored in the controller 60 in the mode of the map data from the relation of the present transmission stage and the present vehicle speed. In other words, the target speed according to the present transmission stage and the present vehicle speed may be stored in the mode of the map data and utilized.

Figure 5:
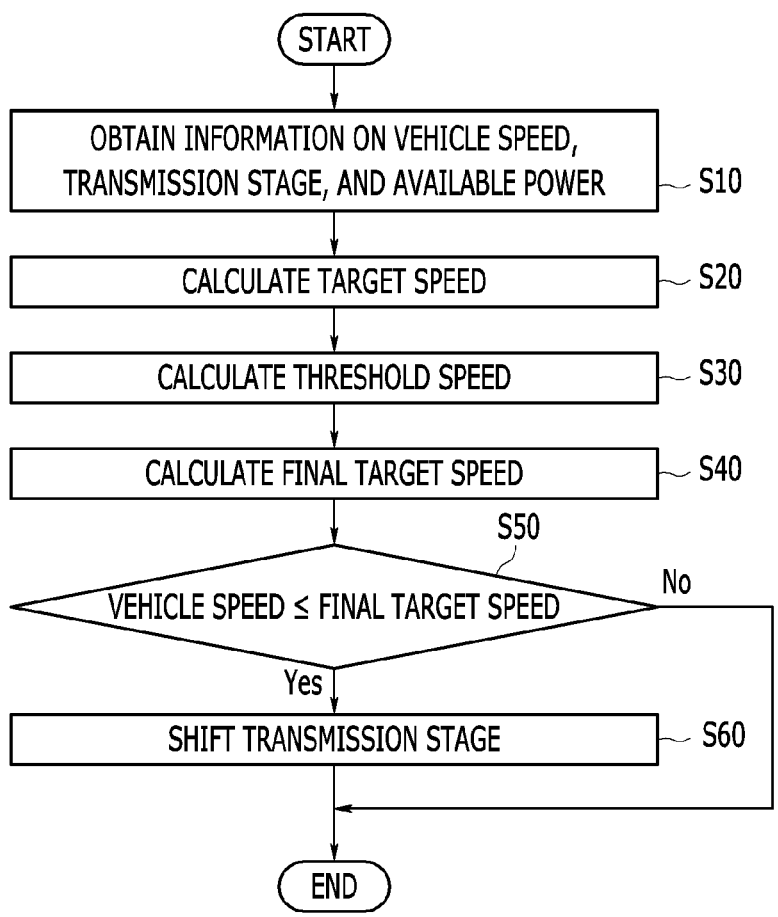
FIG. 5 illustrates an exemplary flowchart of a method for controlling a speed change of a hybrid vehicle according to an exemplary embodiment of the present invention.

Hereafter, a method for controlling a speed change of a hybrid vehicle in accordance with an exemplary embodiment of the present invention will be described in detail. FIG. 5 illustrates an exemplary flowchart showing a method for controlling a speed change of a hybrid vehicle in accordance with an exemplary embodiment of the present invention. Referring to FIG. 5, the controller 60 may be configured to collect information regarding a vehicle speed, the present transmission stage of the transmission 50, and available power from the battery 40 (S10). In other words, the information regarding the output speed of the motor 30 and the present transmission stage of the transmission 50 may be supplied to the controller 60, and the information regarding the available power from the battery 40 may also be supplied to the controller 60.

Particularly, since the vehicle speed may be determined by the output speed of the motor 30 and the present transmission stage of the transmission 50, when the output speed of the motor 30 and the present transmission stage are sensed, the vehicle speed may be calculated. The controller 60 may be configured to shift the present transmission stage of the transmission 50 in the constant speed section of the motor 30 determined by the vehicle speed, the present transmission stage, and the available power from the battery 40. Since the motor 30 may be undergoing the regenerative braking, the present transmission stage may be shifted to a lower transmission stage.

In particular, the controller 60 may be configured to calculate a target speed from the present vehicle speed and the present transmission stage (S20). The target speed may be selected from the information stored in the controller 60 in a mode of map data. The controller 60 may further be configured to calculate a threshold speed of the battery 40 from the vehicle speed and the available power from the battery 40 (S30). In particular, as the threshold speed, the information stored in the controller 60 in the mode of the map data may be utilized. The controller 60 may be configured to calculate a final target speed from the target speed and the threshold speed (S40). In particular, the final target speed may be set as one having a greater value selected from the target speed and a value obtained by addition of a margin to the threshold speed. The controller 60 may also be configured to compare the vehicle speed to the final target speed (S50), and, when the present vehicle speed is less than the final target speed, shift the present transmission stage to a lower transmission stage (S60).

Hereafter, referring to FIGS. 6A and 6B, a speed change control process of a hybrid vehicle in accordance with an exemplary embodiment of the present invention will be described in comparison to a related art speed change control process of the hybrid vehicle.

Figure 6A:
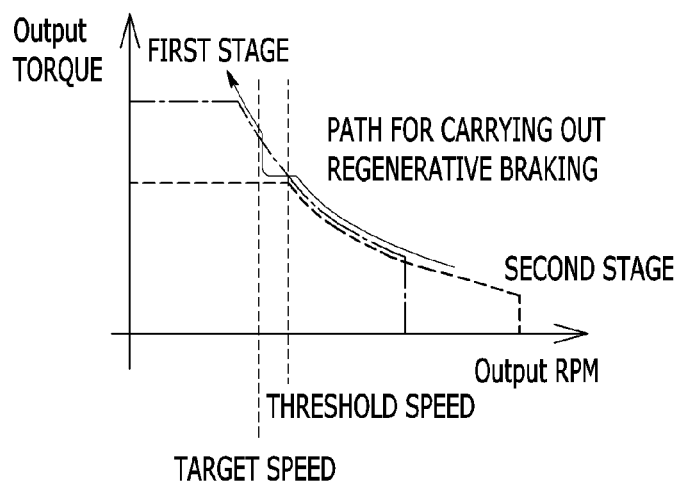
FIGS. 6A and 6B are exemplary graphs showing a process for controlling a speed change of a hybrid vehicle according to an exemplary embodiment.

FIG. 6A is an exemplary graph showing a related art speed change control process of the hybrid vehicle. Further, FIG. 6B is an exemplary graph showing a speed change control process of a hybrid vehicle in accordance with an exemplary embodiment of the present invention. In FIGS. 6A and 6B, the dashed line denotes a motor torque when the present transmission stage is a second stage, and the alternating long and short dashed line denotes a torque of the motor when the present transmission stage is a first stage. Further, the solid line marked with an arrow shows a path of the regenerative braking.

Referring to FIG. 6A, in the related art, since the shifting may be performed when the target speed is less than the threshold speed, the regenerative braking may occur not in the constant power region, but in the constant torque region. Therefore, since a regenerative braking torque may change rapidly in the vicinity of the threshold speed, a driver may feel the sense of difference during braking.

Figure 6B:
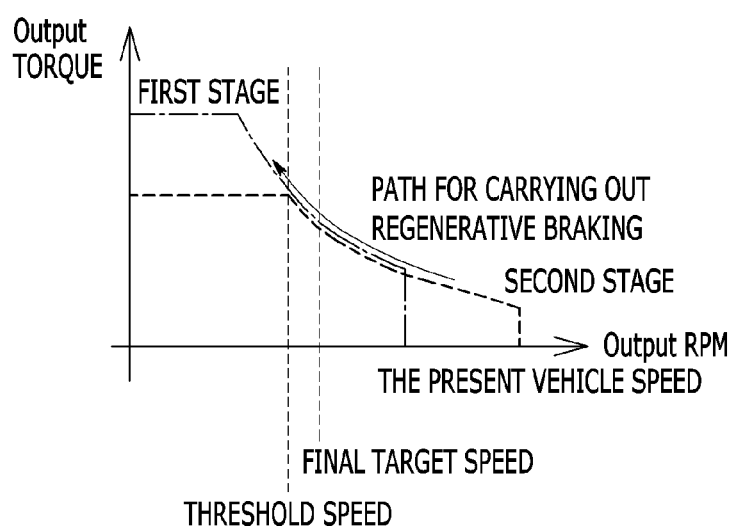

Referring to FIG. 6B, it may be assumed that the present vehicle speed is about 70 kph (kilometers per hour) and the present transmission stage is the second stage. In particular, the motor 30 may be performing the regenerative braking in the substantially constant power region. Further, it may also be assumed that the target speed is calculated to be about 40 kph, and the threshold speed is calculated to be about 50 kph. In particular, since a speed of about 55 kph obtained by adding a margin of about 5 kph to the threshold speed of 50 kph is greater than the target speed of about 40 kph, the final target speed may be about 55 kph.

Since the motor 30 may be performing the regenerative braking, the present vehicle speed may be gradually reduced. Therefore, the controller 60 may be configured to shift the present transmission stage to a lower transmission stage when the present vehicle speed is at about 55 kph or less than about 55 kph while the present vehicle speed is reduced from 70 kph, gradually. Thus, since the present transmission stage may be shifted to a lower transmission stage before the revolutions per minute (RPM) is changed from the substantially constant power region to the substantially constant torque region, the regenerative braking of the motor 30 may be performed at the constant power region. Eventually, the regenerative braking torque may be maintained constant, permitting the driver to feel an improved sense of braking.

DESCRIPTION OF SYMBOLS

10: engine
20: clutch
30: motor
40: battery
50: transmission
60: controller

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An apparatus for controlling a speed change of a vehicle, comprising:
   an engine for combustion of fuel to generate power;
   a motor configured to supplement the power from the engine, and operate as a generator during braking of the vehicle to generate electrical energy and store the generated electrical energy to a battery;
   a transmission configured to convert the power from the engine to a required torque based on a speed and transmitting the power to wheels, and connected in series to the motor; and
   a controller configured to operate the transmission to shift in a constant power section of the motor when the motor is performing regenerative braking,
   wherein the controller is configured to compare the present vehicle speed to a final target speed and shift the present transmission stage when the present vehicle speed is less than the final target speed, and
   wherein the final target speed is set as one having a greater value selected from a target speed calculated from the present transmission stage and the present vehicle speed, and a value obtained by addition of a margin to a threshold speed of the moor calculated from the present transmission stage of the transmission and available power from the battery.

2. The apparatus of claim 1, wherein the threshold speed of the motor is a speed when a rotation speed of the motor is changing from the constant power section to a constant torque section.

3. The apparatus of claim 1, wherein the threshold speed of the motor is stored in the controller in a mode of map data from a relation between the present transmission stage and the available power from the battery.

4. The apparatus of claim 1, wherein the target speed is stored in the controller in a mode of map data from a relation between the present transmission stage and the present vehicle speed.

5. A method for controlling a speed change of a vehicle driven by engine power and motor power which supplements the engine power, comprising:
   sensing, by a controller, a vehicle speed, a transmission stage of a transmission, and available power from a battery;
   shifting, by the controller, the transmission stage of the transmission in a constant power section of the motor from the vehicle speed, the present transmission stage of the transmission, and the available power from a battery during regenerative braking;
   calculating, by the controller, a target speed from the vehicle speed and the present transmission stage;
   calculating, by the controller, a threshold speed of the battery from the vehicle speed and the available power from the battery;
   calculating, by the controller, a final target speed from the target speed and the threshold speed;
   comparing, by the controller, the final target speed to the vehicle speed; and
   shifting, by the controller, the transmission stage when the vehicle speed is less than the final target speed.

6. The method of claim 5, wherein the threshold speed is a speed when a rotation speed of the motor is changing from the constant power section to a constant torque section.

7. The method of claim 5, wherein the final target speed is set as one having a greater value selected from a target speed calculated from the present transmission stage and the present vehicle speed, and a value obtained by addition of a margin to a threshold speed of the motor calculated from the present transmission stage of the transmission and available power from the battery.

8. The method of claim 5, wherein the threshold speed of the motor is a speed when a rotation speed of the motor is changing from the constant power section to a constant torque section.

9. A non-transitory computer readable medium containing program instructions executed by a controller, the computer readable medium comprising:
   program instructions that sense a vehicle speed, a transmission stage of a transmission, and available power from a battery for a vehicle driven by engine power and motor power which supplements the engine power;
   program instructions that shift the transmission stage of the transmission in a constant power section of the motor from the vehicle speed, the present transmission stage of the transmission, and the available power from a battery during regenerative braking;
   program instructions that calculate a target speed from the vehicle speed and the present transmission stage;
   program instructions that calculate a threshold speed of the battery from the vehicle speed and the available power from the battery;
   program instructions that calculate a final target speed from the target speed and the threshold speed;

program instruction that compare the final target speed to the vehicle speed; and program instructions that shift the transmission stage when the vehicle speed is less than the final target speed.

10. The non-transitory computer readable medium of claim 9, wherein the threshold speed is a speed when a rotation speed of the motor is changing from the constant power section to a constant torque section.

11. The non-transitory computer readable medium of claim 9, wherein the final target speed is set as one having a greater value selected from a target speed calculated from the present transmission stage and the present vehicle speed, and a value obtained by addition of a margin to a threshold speed of the motor calculated from the present transmission stage of the transmission and available power from the battery.

12. The non-transitory computer readable medium of claim 9, wherein the threshold speed of the motor is a speed when a rotation speed of the motor is changing from the constant power section to a constant torque section.

* * * * *